United States Patent [19]

Starr

[11] Patent Number: 5,440,898
[45] Date of Patent: Aug. 15, 1995

[54] FILTER-DRYER UNIT

[75] Inventor: Thomas L. Starr, Roswell, Ga.

[73] Assignee: Sporlan Valve Company, Washington, Mo.

[21] Appl. No.: 181,764

[22] Filed: Jan. 21, 1994

[51] Int. Cl.⁶ ................ F25B 43/00; B01D 29/00
[52] U.S. Cl. .......................... 62/474; 34/80; 210/446; 210/DIG. 7
[58] Field of Search ............ 34/80; 62/474, 503, 62/512; 55/DIG. 5, DIG. 17; 210/435, 446, DIG. 7

[56] References Cited

U.S. PATENT DOCUMENTS

| | | | |
|---|---|---|---|
| 2,405,884 | 8/1946 | Greger | 23/105 |
| 2,583,812 | 1/1952 | Briggs et al. | 210/112 |
| 2,914,487 | 11/1959 | Hoffman | 252/455 |
| 3,025,233 | 3/1962 | Figert | 210/502 |
| 3,172,935 | 3/1965 | Hoffman | 264/331 |
| 3,407,617 | 10/1968 | Wischmeyer et al. | 62/85 |
| 3,434,599 | 3/1969 | Wischmeyer et al. | 210/266 |
| 3,815,752 | 6/1974 | Hoffman et al. | 210/266 |
| 3,841,490 | 10/1974 | Hoffman et al. | 210/266 |
| 4,029,580 | 6/1977 | Lange | 210/136 |
| 4,104,044 | 8/1978 | Lange | 62/324 |
| 4,227,901 | 10/1980 | Lange | 55/301 |
| 4,266,408 | 5/1981 | Krause | 62/474 |
| 4,320,000 | 3/1982 | Lange et al. | 210/117 |
| 4,645,519 | 2/1987 | Fraioli et al. | 55/208 |
| 4,748,082 | 5/1988 | Dörr et al. | 428/331 |
| 4,908,132 | 3/1990 | Koval et al. | 210/446 |
| 4,954,252 | 9/1990 | Griffin et al. | 210/136 |
| 5,332,426 | 7/1994 | Tang et al. | 96/153 |

OTHER PUBLICATIONS

J. E. Lyon, "An Inhibited Phosphoric Acid for Use in High-Alumina Refractories," Ceramic Bulletin, vol. 45, No. 7 (1966).

*Primary Examiner*—Henry A. Bennet
*Assistant Examiner*—William C. Doerrler
*Attorney, Agent, or Firm*—Cohn, Powell & Hind

[57] ABSTRACT

This refrigerant filter-drier core is molded from a permeable matrix which includes desiccant particles, a binder and reinforcing fibers, the fibers being fixed in place by the binder and being effective to impart strength and permeability to the filter-drier core.

20 Claims, 1 Drawing Sheet

FILTER-DRYER UNIT

BACKGROUND OF THE INVENTION

This invention relates generally to filter-driers for refrigeration systems and particularly to a molded filter-drier core having increased water capacity while maintaining the physical characteristics of attrition resistance, strength and permeability.

New refrigerants, which have been developed to counter ozone depletion, have considerably higher water solubility, than previous refrigerants and lubricants. For example, for the new refrigerant R-134a, the water solubility is 1200 ppm as compared to 65 ppm for CFC refrigerant R-12 at comparable temperatures.

Similarly, the lubricants such as polyalkylene glycol and the polyester lubricants developed for use with the new refrigerants are hydroscopic compared with the mineral oils used for the CFC refrigerants. For example, the new lubricants commonly have a water solubility of 200 ppm and greater.

In view of the fact the new refrigerants and lubricants have a greater affinity for water it is important to provide refrigerant filter-driers with greater water capacity, without sacrificing other important qualities such as attrition resistance, strength and permeability, acid removal ability, and filtration than have been available for use with the CFC refrigerants.

In filter-driers used for CFC refrigerants, a typical composition by weight is 64% activated alumina, 15% molecular sieve, 2% kaolin and 19% binder. The molecular sieve is by far the greatest contributor to the water removal capacity of such a composition and 15% molecular sieve was more than adequate for the CFC refrigerants and lubricants. However, this molecular sieve content is insufficient to be effective with the new refrigerants such as R134a. One solution is to simply make the filter-drier core larger. However, this results in units which are considerably larger than units used for CFC refrigerants and is commercially unacceptable.

It is possible to increase the molecular sieve content of a composition to an amount considerably in excess of 15%. However, the strength can only be maintained by increasing the density of the composition of the molded core by excessive compression. Unfortunately, the increase in density results in an undesirable reduction in permeability and filtration ability. Reduction in permeability, in turn, results in a reduced flow rate through the filter-drier core which is likewise unacceptable.

The present filter-drier core solves these and other problems in a manner not revealed in the known prior art.

SUMMARY OF THE INVENTION

This filter-drier core is formed from a composition having a high molecular sieve content and includes the addition of fibers which increases the gas permeability, and thus the permeability of the core to circulated refrigerant, without adversely affecting the other physical characteristics.

Gas permeability is an important property for a porous desiccant body providing a filter-drier core intended to remove moisture from a refrigerant. The addition of a selected amount of fiber to the desiccant composition has been found to increase the gas permeability for core material formulated to fixed values for the other physical characteristics, including moisture capacity, without the disadvantages of increasing the size of the filter-drier core.

This invention provides a filter drier for drying refrigerant circulated in a refrigeration system by removing moisture therefrom, the filter drier comprising a drier casing having a filter-drier core supported therein, the casing having an inlet for admitting moisture containing refrigerant into the casing and an outlet for permitting passage of dried refrigerant out of the casing, the filter-drier core being supported between the inlet and outlet and having means for permitting flow of refrigerant through the filter-drier core, the filter-drier core being a permeable matrix of desiccant particles, a binder and reinforcing fibers, the fibers being distributed throughout the matrix and fixed in place by the binder, the fibers being effective to impart strength and permeability to the filter drier core.

It is an aspect of this invention to provide that the matrix has above about 40% by weight of molecular sieve desiccant particles and preferably about 40%-50%.

It is another aspect of this invention to provide that the desiccant particles include activated alumina in the range of about 25%-30% of the matrix by weight.

It is yet another aspect of this invention to provide that the fiber is above about 0.5% of the matrix by weight and preferably between 0.5%-12%.

It is still another aspect of this invention to provide that the fiber composition is above about 40% $SiO_2$ by weight.

It is an aspect of this invention to provide that the fibers are between about 2-10 microns in diameter and between about 25-6350 microns in length.

It is still another aspect of this invention to provide that the binder is a phosphate binder.

It is yet another aspect of this invention to provide that the permeability of the core is substantially the same as for a core having as desiccant, molecular sieve, in the amount of about 15% of the matrix by weight, and activated alumina, in the amount of about 65% of the matrix by weight, and having no fiber.

It is an aspect of this invention to provide a method of drying refrigerant circulated in a refrigeration system to remove moisture from the refrigerant, comprising circulating the refrigerant through a casing having a filter-drier core supported therein, the filter-drier core being a permeable matrix of desiccant particles, a binder and reinforcing fibers, the fibers being distributed throughout the matrix and fixed in place by the binder, the fibers being effective to impart strength and permeability to the filter-drier core.

This filter-drier core is relatively inexpensive and simple to manufacture and use and is particularly effective for its intended purpose.

DESCRIPTION OF THE PREFERRED EMBODIMENT

Figure 1:
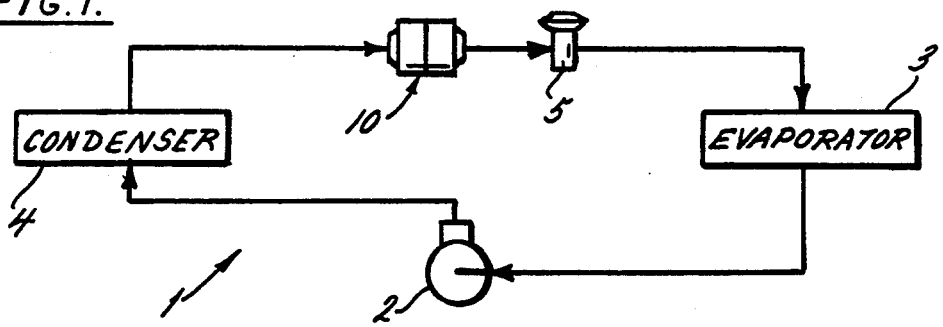
FIG. 1 is a diagram of a refrigeration system utilizing the filter-drier assembly in the liquid line.

Referring now by reference numerals to the drawing and first to FIG. 1 it will be understood that the filter-drier assembly 10 is used in a refrigeration system 1 which includes a compressor 2, an evaporator 3, a condenser 4, and an expansion valve 5. The filter-drier assembly 10 is used to protect refrigeration system 1 including the expansion valve 5 from contaminants in the liquid refrigerant as well as harmful chemical reactions resulting from the introduction of other contaminants in the system and in the embodiment shown, is situated between condenser 4 and the expansion valve 5.

Figure 2:
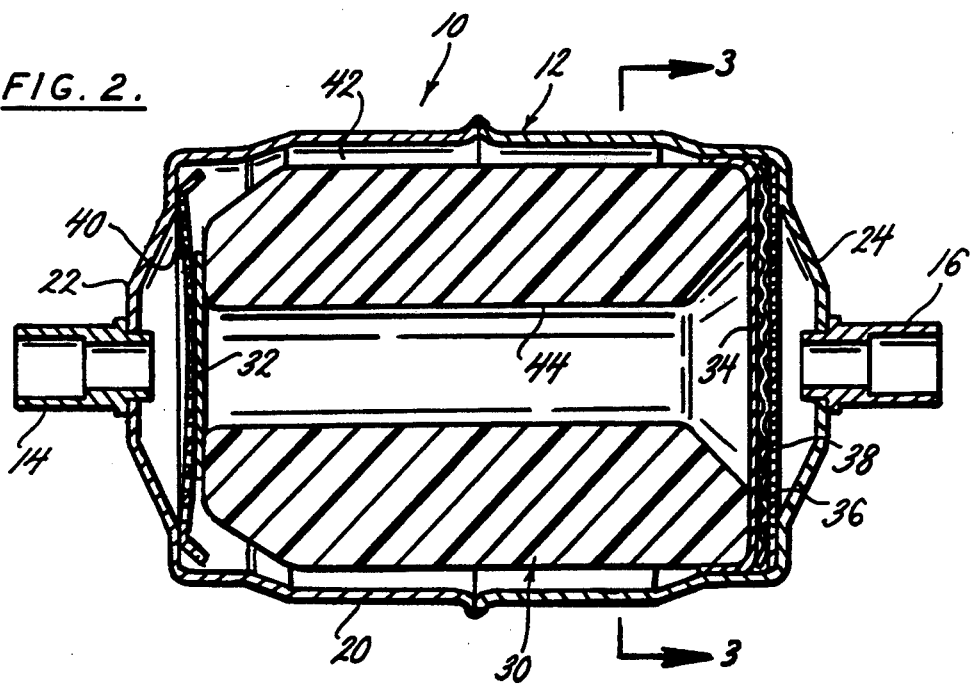
FIG. 2 is a longitudinal cross sectional view of the filter-drier assembly.
Figure 3:
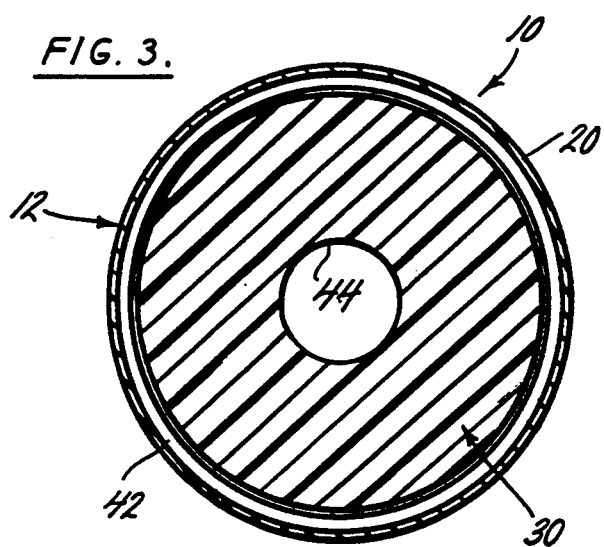
FIG. 3 is a cross-sectional view taken on Line 3—3 of FIG. 2.

FIG. 2 is an arrangement of parts to a filter-drier assembly similar to one which has been manufactured by Sporlan Valve Company of St. Louis, Mo. for many years. U.S. Pat. No. 2,583,812 discloses a similar casing for a molded core and U.S. Pat. No. 3,025,233 discloses a core molded from a similar composition, and are incorporated herein by reference. However, the composition of the improved molecular sieve is different as will appear.

More specifically, the filter-drier assembly 10 includes a generally cylindrical housing 12 having an inlet fitting 14 at one end, and an outlet fitting 16 at the other end. The housing includes a cylindrical intermediate portion 20 and end walls 22 and 24. In the embodiment shown, an improved hollow filter-drier core 30 is disposed within the housing 12. The filter-drier core 30 is provided with an imperforate disc end closure 32 at the inlet end and a fiberglass, cup-shaped end closure 34 at the outlet end. A wire screen 36 is sandwiched between the end closure 34 and a perforate disc 38 which is disposed against the housing end wall 24. The core 30 is held in place within the housing 12 by the spring action of a leaf spring 40 disposed between the housing end wall 22 and the end closure 32.

The filter-drier core is diametrically spaced from the cylindrical housing 12 to provide an annular passage 42 and a central passage 44 so that refrigerant liquid must pass through the filter-drier core 30 in passing from the inlet fitting 14 to the outlet fitting 16.

The improved core 30 is similar to cores known in the prior art in that it is molded from a composite material or matrix which includes a desiccant such as beaded molecular sieve(m), which has a high water removal capacity at low relative humidity; a desiccant such as activated alumina(a), which has a high acid removal capability as well as water removal capacity; a binder such as a phosphate binder(b), and a relatively small percentage of kaolin.

In the embodiment shown, the molecular sieve (m) is a synthetic zeolite, metal alumino-silicate such as Types 4A, 3A, manufactured by Zeochem Inc. of Louisville, Ky.; the activated alumina is temperature activated C40 Alumina manufactured by Aluminum Company of America of Vidalia La. and the phosphate binder is an aluminum phosphate binder of the type disclosed in U.S. Pat. Nos. 2,583,812 and 2,405,884 which are incorporated herein by reference.

Figure 4:
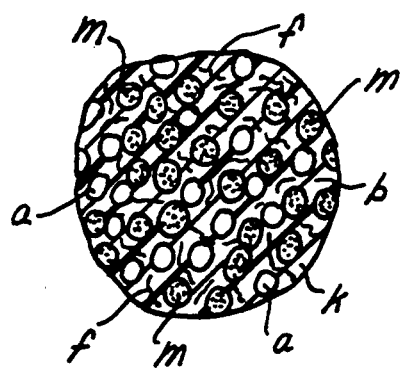
FIG. 4 is an enlarged cross-sectional view showing the material of the core.

The improved core 30 is distinguished from known cores in that it includes an increased amount of molecular sieve and also includes fibers(f) as shown in FIG. 4. In the embodiment shown the fibers are non-metallic fibers such as Refrasil ® silica fiber or Fiberfrax ® ceramic fiber, both manufactured by The Corborundum Company. The improved core and the prior art core are manufactured in substantially the same way. The combination of materials is pressed in a mold to the desired shape and fired to "set" the binder and activate the molecular sieve and activated alumina.

A core such as that described above, constitutes a shaped body suitable for in-line filtration and drying of a fluid or gas refrigerant and in addition to having a high water capacity, must be permeable enough to allow flow of the particular fluid refrigerant with a reasonable back pressure. It must be strong enough in the green (unfired or uncured) state to allow handling during manufacture and strong enough in the fired state to resist the stresses encountered during installation and use.

Comparisons were made between prior art filter-drier cores and improved filter-drier cores having increased amounts of molecular sieve desiccant and specific amounts of two types of fiber.

A test disc equivalent to the prior art Sporlan Valve Company filter-drier core formed from these materials, without the fiber, shows the following formulation by weight in the green state.

| Material | Percent | Test disc |
| --- | --- | --- |
| Activated Alumina | 65 | 11.4 |
| Molecular Sieve | 15 | 2.7 |
| Kaolin | 2 | 0.4 |
| Phosphate Binder | 18 | 3.1 |
| | 100. | *17.6 |

*See Table I

This composite core has been very effective for use with CFC refrigerants such as R12. However, it has not proved satisfactory for use with refrigerants such a R134a which has water solubility of up to twenty times that of R12.

Increasing the amount of molecular sieve in this formulation provides the necessary increase in water capacity. However, the increase in the amount of molecular sieve alone produces an undesirable decrease in physical properties if the same size unit is used, or an unacceptable increase in the size of the unit if the same proportion of molecular sieve is used.

Compensation for the reduction in physical properties can be made by increasing the amount of binder and increasing the density of the core by excessive compression. However, both of these changes reduce permeability to an unacceptable level, greatly increasing the pressure drop through the core.

I have found that the solution is to increase the amount of molecular sieve and, at the same time, increase the green and fired physical properties of the drier core by adding a reinforcing fiber to the composition prior to molding and firing. This addition of fiber permits a significantly greater amount of molecular sieve to be used without adversely affecting the other physical properties and more specifically without reducing permeability.

Laboratory tests were carried out to compare the compositions of drier core material using a standard disc-shaped pellet having a diameter of 3.8 cm (1.5 in.) and compacted to a thickness to provide the strength listed in the tables below. Water capacity, permeability and strength were measured for different compositions molded and fired in an identical manner.

Tables I, II, III and IV below summarize the results of these tests.

The combination of materials is pressed in a mold to the desired shape and fired to "set" the binder and activate the molecular sieve.

TABLE I

Comparison of Standard and High Molecular Sieve

| Formulation Units | Activated Alumina grams (%) | Molecular Sieve grams (%) | Kaolin grams (%) | Phosphate Binder grams (%) | Strength newtons grams (%) |
|---|---|---|---|---|---|
| Standard | 11.4 (65) | 2.7 (15) | 0.4 (2) | 3.1 (18) | 151 (100) |
| High Ms | 5.0 (31) | 7.7 (48) | 0.4 (2) | 3.1 (19) | 55 (36) |

Table I results from a first series of tests and illustrates the effect of increasing the amount of molecular mix and demonstrates that increasing the amount of molecular sieve from 2.7 g to 7.7 g resulted in a strength reduction to about 36% of the standard formulation. The standard formulation is approximately equivalent to that used for the prior art formulation produced by the Sporlan Valve Company and discussed above. These results demonstrate that increasing the molecular sieve alone does not solve the problem. On the other hand, to increase all of the other ingredients of the mix proportionally results in a considerably larger core which is unacceptable.

TABLE II

Comparison of High Molecular Sieve with Fiber Addition

| Formulation Units | Activated Alumina grams (%) | Molecular Sieve grams (%) | Kaolin grams (%) | Phosphate Binder grams (%) | Fiber grams (%) | Strength newtons |
|---|---|---|---|---|---|---|
| No Fiber | 5.5 (33) | 7.6 (45) | 0.4 (2) | 3.4 (20) | 0.00 (0) | 99 |
| 1% Fiber A | 5.5 (32) | 7.6 (45) | 0.4 (2) | 3.4 (20) | 0.15 (1) | 138 |
| 4% Fiber A | 5.5 (31) | 7.6 (44) | 0.4 (2) | 3.4 (19) | 0.72 (4) | 154 |
| 8% Fiber A | 5.5 (30) | 7.6 (41) | 0.4 (2) | 3.4 (18) | 1.50 (8) | 203 |

Fiber A is F100-A-25 Refrasil ® silica fiber manufactured by The Carborundum Company, Hitco Materials Division, of Gardens, California.

Table II results from a second series of tests and illustrates the effect of adding Fiber A (Refrasil ®) to high molecular sieve mix samples comparable to that tested in Table I. The packing densities of the pellets tested in Table II, as formulated, are somewhat higher than those tested in Table I and the strength of the pellets is somewhat increased by that factor. However, the dramatic strength increases of over 50% for 4% Fiber A added and over 100% for 8% Fiber A added clearly illustrates the unexpected beneficial effects of adding fiber of this type.

TABLE III

Comparison of High Molecular Sieve with Fiber Addition

| Formulation Units | Activated Alumina grams (%) | Molecular Sieve grams (%) | Kaolin grams (%) | Phosphate Binder grams (%) | Fiber grams (%) | Strength newtons |
|---|---|---|---|---|---|---|
| No Fiber | 5.5 (33) | 7.6 (48) | 0.4 (2) | 3.1 (19) | 0.00 (0) | 70 |
| 4% Fiber A | 5.3 (32) | 7.2 (43) | 0.4 (2) | 3.1 (19) | 0.7 (4) | 80 |
| 8% Fiber A | 5.0 (30) | 6,.8 (41) | 0.4 (2) | 3.1 (19) | 1.30 (8) | 90 |
| 4% Fiber B | 15.3 (32) | 7.2 (43) | 0.4 (2) | 3.1 (19) | 0.70 (4) | 95 |
| 8% Fiber B | 15.0 (30) | 6.8 (41) | 0.4 (2) | 3.1 (19) | 1.30 (8) | 120 |

Fiber B is EF-119 Fiberfrax ® ceramic fiber manufactured by The Carborundum Company, Fibers Division, of Niagara Falls, New York.

Table III results from a third series of tests in which various amounts of Fiber A (Refrasil ®) and Fiber B (Fiberfrax ®) were blended into a high molecular sieve formulation. In that series of tests the amounts of the molecular sieve materials were reduced slightly in the pellets with fiber so that the packing densities of all pellets remained substantially the same. The amount of binder is lower than that in Table II. The beneficial effects of adding either fiber is clearly illustrated with higher strengths resulting from Fiber B.

Gas permeability is a very important property for a filter-drier core intended to remove moisture from a refrigeration liquid. A high value for gas permeability is desirable because it reduces the pressure required to force the refrigerant through the core. The addition of fiber has been found to increase the gas permeability for a body formulated to fixed values of strength and moisture capacity.

TABLE IV

Comparison of Gas Permeabilities for Drier Core Formulations with Comparable Moisture Capacity and Strength and Comparison to Prior Art.

| Formulation Units | Activated Alumina grams (%) | Molecular Sieve grams (%) | Fiber grams (%) | Kaolin grams (%) | Phosphate Binder grams (%) | Strength newtons | Permeability *v/cm$^3$/m |
|---|---|---|---|---|---|---|---|
| Lower Strength | | | | | | | |
| No Fiber | 5.5 (33) | 7.6 (45) | 0.00 | 0.4 (2) | 3.4 (20) | 54 | 541 |
| 8% Fiber | 4.4 (30) | 6.1 (42) | 1.20 (8) | 0.3 (2) | 2.7 (18) | 52 | 1560 |
| Higher Strength | | | | | | | |
| No Fiber | 5.5 (33) | 7.6 (45) | 0.00 | 0.4 (2) | 3.4 (20) | 99 | 258 |
| 8% Fiber Standard | 5.0 (30) | 6.8 (41) | 1.35 (8) | 0.4 (2) | 3.1 (19) | 101 | 462 |

TABLE IV-continued

Comparison of Gas Permeabilities for Drier Core Formulations with Comparable Moisture Capacity and Strength and Comparison to Prior Art.

| Formulation Units | Activated Alumina grams (%) | Molecular Sieve grams (%) | Fiber grams (%) | Kaolin grams (%) | Phosphate Binder grams (%) | Strength newtons | Permeability *v/cm³/m |
|---|---|---|---|---|---|---|---|
| No Fiber | 11.4 (65) | 2.7 (15) | 0.00 | 0.4 (2) | 3.1 (18) | 151 | 469 |

Units for permeability are output voltage for an electronic pressure gauge over gas flow rate in cm³ per minute. This provides a relative measure for gas permeabilities of different pellets measured in an identical manner.

Table IV results from a fourth series of tests and illustrates that the addition of fiber to disc-shaped pellets formed with comparable moisture capacity, ie. identical proportions of molecular sieve, activated alumina, kaolin and phosphate binder, and comparable strength results in measured gas permeability significantly higher for pellets with the addition of fiber. The properties of Refrasil ® (Fiber A) and Fiberfrax ® (Fiber B), are set forth below.

| F100-A-25 Refrasil ® Silica Fiber (Fiber A) | |
|---|---|
| Pre-molded Physical Properties | |
| Fiber Diameter | 0.0004 in. (10 microns) |
| Length | 0.25 in. (6350 microns) |
| Density | 13 lb/cu.ft. (0.208 g/cc) |
| Typical Chemical Composition | |
| $SiO_2$ | 98.8% |
| Other | |
| $TiO_2$ | 0.47% |
| $B_2O_3$ | 0.29 |
| $Al_2O_3$ | 0.16 |
| CaO | 0.044 |
| $ZrO_2$ | 0.024 |
| $Fe_2O_3$ | 0.017 |
| $CrO_3$ | 0.004 |
| MgO | 0.004 |
| CuO | 0.000 |

Refrasil ® (Fiber A) is manufactured by The Carborundum Company Hitco Materials Division of Gardens, California.

| EF-119 Fiberfrax ® Ceramic Fiber (Fiber B) | |
|---|---|
| Typical Chemical Analysis | |
| $Al_2O_3$ | 45–51% |
| $SiO_2$ | 46–52 |
| $Na_2O$ | 0–0.2 |
| $Fe_2O_3$ | 0–1.1 |
| $TiO_2$ | 0–1.8 |
| Leachable Chlorides | <10 ppm |
| Typical Physical Properties | |
| Melting Point | 3260° F. (1790° C.) |
| Fiber Diameter | 2–3 microns (mean) |
| Fiber Length | 25 microns (mean) |
| Fiber Surface Area | 0.5 m²/g |
| Spec Gravity | 2.7 g/cm³ |

Fiberfrax ® (Fiber B) is manufactured by The Carborundum Company, Fibers Division, of Niagara Falls, New York.

Summary

It is clear from the above results that by altering the activated alumina/molecular sieve formulation proportions in a test disc from 65%/15% (standard) to 31%/48% (high molecular sieve) with the proportion of binder unchanged, there is a strength reduction to 36%, see Table I.

However, with a substantially similar high molecular sieve formulation of 32%/45% having 1% Refrasil ® fiber added the strength is increased by 39% over a high molecular sieve disc having no fiber. Similarly with 4% Refrasil ® fiber added the strength is increased by 55% and with 8% Refrasil ® fiber added the strength is increased by 105%, see Table II.

In a comparison study of Refrasil ® fiber and Fiberfrax ® fiber the latter performed 19% better with 4% fiber added, and 33% better with 8% fiber added as far as strength is concerned, see Table III. It was found that adding much in excess of 8% fiber affected the workability of the mix to an unacceptable level with no significant increase in strength or permeability properties. However, greater than 8% (for example 12%) or less than 1% (for example 0.5%) can be added and result in a noticeable improvement over standard compositions.

Finally, a comparison study of high molecular sieve discs having no fiber and 8% fiber, respectively, but having comparable strength, showed that the permeability was markedly improved by 288% for low strength discs and 179% for high strength discs, see Table IV.

The above tests indicated clearly that high molecular sieve formulation cores of about 45% of molecular sieve can be produced with equivalent or better physical properties and permeability with the addition of from 1%–8% fibers of the type represented by Refrasil ® and Fiberfrax ® and equivalent fibers.

A test disc formed in accordance with the invention shows the following formulation by weight.

| Material | Percent | Test Disc |
|---|---|---|
| Activated Alumina | 30 | 5.0 |
| Molecular Sieve | 41 | 6.8 |
| Kaolin | 2 | 0.4 |
| Phosphate Binder | 19 | 3.1 |
| Fiberfrax ® Fiber | 8 | 1.35 |
| | 100 | 16.65 |

With this combination, the proportion by weight of molecular sieve was increased from 2.7 g (15%) to 6.8 g (41%) ie by a factor of almost three. This increase was achieved without adverse effect on the other physical properties, particularly permeability. In addition, and unexpectedly, the water capacity was increased by at least 100%.

The invention has been described by making reference to a preferred filter-drier core construction. However, the details of description are not to be understood as restrictive, numerous variants being possible with the principles disclosed and with the fair scope of the claims hereunto appended.

I claim as my invention:

1. A filter drier for drying refrigerant circulated in a refrigeration system by removing moisture therefrom, the filter drier comprising:
   a drier casing having a filter-drier core supported therein,
   the casing having an inlet for admitting moisture containing refrigerant into the casing and an outlet for permitting passage of dried refrigerant out of the casing, the filter-drier core being supported between the inlet and outlet and having means for permitting flow of refrigerant through the filter-drier core, the filter-drier core being a permeable matrix of desiccant particles including beaded molecular sieve, activated alumina, a phosphate binder and reinforcing fibers, the fibers being distributed throughout the matrix and fixed in place by the binder, the fibers being effective to impart strength and permeability to the filter-drier core.

2. A filter drier as defined in claim 1, in which the desiccant includes molecular sieve in the range of about 40%–50% of the matrix by weight.

3. A filter drier as defined in claim 1, in which the desiccant includes activated alumina in the range of about 25%–30% of the matrix by weight.

4. A filter drier as defined in claim 1, in which the fiber is in the range of 0.5%–12% of the matrix by weight.

5. A filter drier as defined in claim 1, in which the fiber composition is above about 40% $SiO_2$ by weight.

6. A filter drier as defined in claim 1, in which the fibers are between about 2–10 microns in diameter and between about 25–6350 microns in length.

7. A filter drier as defined in claim 1, in which the permeability of the core is substantially the same as for a core having as desiccant molecular sieve in the amount of 15% of the matrix by weight and having no fiber, the core providing a substantially greater moisture removal capacity.

8. A filter drier as defined in claim 1, in which the permeability of the core is substantially the same as for a core having as desiccant, molecular sieve, in the amount of about 15% of the matrix by weight, and activated alumina, in the amount of about 65% of the matrix by weight, and having no fiber, the core providing a substantially greater moisture removal capacity.

9. A filter drier for drying refrigerant circulated in a refrigeration system by removing moisture therefrom, the filter drier comprising:

a drier casing having a filter-drier core supported therein, the casing having an inlet for admitting moisture containing refrigerant into the casing and an outlet for permitting passage of dried refrigerant out of the casing, the filter-drier core being supported between the inlet and outlet and having means for permitting flow of refrigerant through the filter drier, the filter-drier core being a permeable matrix including beaded molecular sieve, activated alumina, a phosphate binder and reinforcing fibers the fibers being distributed throughout the matrix and fixed in place by the binder, the fiber imparting strength and permeability to the matrix, the matrix having above about 40% by weight of molecular sieve and having a test strength effective to maintain the integrity of the drier core during normal operation of the refrigeration system and having a permeability effective to permit removal of moisture from the refrigerant.

10. A filter drier as defined in claim 9 in which the fiber is above about 0.5% of the matrix by weight.

11. A filter drier as defined in claim 10, in which the fiber is in the range of about 4%–8% of the matrix by weight.

12. A filter drier as defined in claim 10, in which the fiber composition is in the range of about 98%–100% $SiO_2$ by weight.

13. A filter drier as defined in claim 12, in which the fibers are about 10 microns in diameter and about 6350 microns in length.

14. A filter drier as defined in claim 10, in which the fiber composition is in the range of about 45%–46% $Al_2O_3$ by weight and in the range of about 46%–47% $SiO_2$ by weight.

15. A composition as defined in claim 14, in which the fibers have a mean diameter of about 2–3 microns and have a mean length of about 25 microns.

16. A filter drier for drying refrigerant circulated in a refrigeration system by removing moisture therefrom, the filter drier comprising:

a drier casing having a filter-drier core supported therein, the casing having an inlet for admitting moisture containing refrigerant into the casing and an outlet for permitting passage of dried refrigerant out of the casing, the filter-drier core being supported between the inlet and outlet and having means for permitting flow of refrigerant through the filter drier, the filter-drier core being a permeable matrix including beaded molecular sieve in the range of about 40%–50% of the matrix by weight, activated alumina in the range of about 25%–30% of the matrix by weight, a phosphate binder in the range of about 15%–20% of the matrix by weight and a non-metallic fiber in the range of about 4%–8% of the matrix by weight.

17. A filter drier core as defined in claim 16, in which the fibers are between about 2–10 microns in diameter and between about 25–6350 microns in length.

18. A method of drying refrigerant circulated in a refrigeration system to remove moisture from the refrigerant, comprising circulating the refrigerant through a casing having a filter-drier core supported therein, the filter-drier core being a permeable matrix of desiccant particles including beaded molecular sieve, activated alumina a phosphate binder and reinforcing fibers, the fibers being distributed throughout the matrix and fixed in place by the binder, the fibers being effective to impart strength and permeability to the filter-drier core.

19. A method of drying refrigerant circulated in a refrigeration system to remove moisture from the refrigerant comprising circulating the refrigerant through a filter-drier casing, the filter-drier casing having an inlet and an outlet for the circulated refrigerant and having a filter-drier core supported in the casing between the inlet and the outlet for the circulated refrigerant, the filter-drier core having means permitting flow of refrigerant through the filter-drier core, the filter-drier core having a permeable matrix including beaded molecular sieve in the range of about 40–50% of the matrix by weight, activated alumina in the range of about 25–30% of the matrix by weight, a phosphate binder in the range of about 15–20% of the matrix by weight and a non-metallic fiber in the range of about 4–8% of the matrix by weight, the fibers being distributed throughout the matrix and fixed in place by the binder, the fibers being effective to impart strength and permeability to the filter-drier core.

20. A filter drier for drying refrigerant circulated in a refrigeration system by removing moisture therefrom, the filter drier comprising:
- a drier casing having a filter-drier core supported therein,
- the casing having an inlet for admitting moisture containing refrigerant into the casing and an outlet for permitting passage of dried refrigerant out of the casing, the filter-drier core being supported between the inlet and outlet and having means for permitting flow of refrigerant through the filter-drier core,
- the filter-drier core being a permeable matrix of desiccant particles the desiccant includes beaded molecular sieve and activated alumina, the molecular sieve being present in an amount greater by weight than the amount of activated alumina, a phosphate binder and reinforcing fibers, the fibers being distributed throughout the matrix and fixed in place by the binder, the fibers being effective to impart strength and permeability to the filter-drier core, the core providing a substantially greater moisture removal capability than a conventional core in which the molecular sieve is present in an amount smaller by weight than the amount of activated alumina.

* * * * *

UNITED STATES PATENT AND TRADEMARK OFFICE
CERTIFICATE OF CORRECTION

PATENT NO. : 5,440,898
DATED : 15 August 1995
INVENTOR(S) : Thomas L. Starr

It is certified that error appears in the above-identified patent and that said Letters Patent is hereby corrected as shown below:

```
Column 5-6, TABLE IV, line 64 at 8% Fiber and Kaolin, delete
     "0.3" and insert --0.4--

Column 5-6, Table I, line 6 at Formulation, delete "newtons"

Column 5-6, Table I, line 7 at Units, delete "grams" and insert
     --newtons--

Column 5-6, Table III, line 20 at 8% Fiber A and Molecular Sieve,
     delete "6,.8" and insert --6.8--

Column 5-6, line 48, delete "Gardens" and insert --Gardena--

Column 7, line 38, delete "Gardens" and insert --Gardena--
```

Signed and Sealed this

Eighteenth Day of June, 1996

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,440,898
DATED : August 15, 1995
INVENTOR(S) : Thomas L. Starr

It is certified that error appears in the above-indentified patent and that said Letters Patent is hereby corrected as shown below:

On title page, item [73], add --, Jefferson Products Company, Washington, Mo., and Kaydon Corporation, LaGrange, Ga.-- after "Mo."

Signed and Sealed this

Thirteenth Day of August, 1996

Attest:

BRUCE LEHMAN

Attesting Officer

Commissioner of Patents and Trademarks